US008548854B2

(12) United States Patent
Sobol et al.

(10) Patent No.: US 8,548,854 B2
(45) Date of Patent: Oct. 1, 2013

(54) CONTENT DISTRIBUTION UTILIZING ACCESS PARAMETER DATA

(75) Inventors: Craig Scott Sobol, Waxhaw, NC (US);
Ty C. Vaughan, Charlotte, NC (US);
Richard H. Thomas, Charlotte, NC (US); Jan Vlcek, Sammamish, WA (US);
Sunil Mathur, Hockessin, DE (US);
Jian James Chen, Newark, DE (US);
Marcin Pietras, Middletown, DE (US);
Mukesh Mittal, Bear, DE (US);
Richard Knafelz, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 205 days.

(21) Appl. No.: 13/104,509

(22) Filed: May 10, 2011

(65) Prior Publication Data

US 2012/0290398 A1    Nov. 15, 2012

(51) Int. Cl.
*G06Q 30/00* (2012.01)
(52) U.S. Cl.
USPC ..................................... 705/14.66; 705/14.49
(58) Field of Classification Search
USPC ....................................................... 705/14.66
See application file for complete search history.

(56) References Cited

U.S. PATENT DOCUMENTS

| | | | |
|---|---|---|---|
| 5,819,226 A | | 10/1998 | Gopinathan et al. |
| 6,003,019 A | * | 12/1999 | Eaton et al. ..................... 705/42 |
| 6,658,393 B1 | | 12/2003 | Basch et al. |
| 7,421,410 B1 | * | 9/2008 | Schechtman et al. ........... 705/43 |
| 7,926,711 B2 | * | 4/2011 | Taylor et al. ................... 235/379 |
| 8,280,787 B1 | * | 10/2012 | Gandhi ............................ 705/30 |
| 2002/0035541 A1 | * | 3/2002 | Makino et al. .................. 705/43 |
| 2002/0147669 A1 | * | 10/2002 | Taylor et al. .................... 705/35 |
| 2003/0083970 A1 | * | 5/2003 | Bigman et al. .................. 705/35 |
| 2003/0119478 A1 | * | 6/2003 | Nagy et al. ..................... 455/408 |
| 2005/0192862 A1 | | 9/2005 | Modi |
| 2006/0038004 A1 | * | 2/2006 | Rielly et al. ................... 235/379 |
| 2007/0005498 A1 | * | 1/2007 | Cataline et al. ................. 705/42 |
| 2007/0265948 A1 | * | 11/2007 | Maiorino et al. ............... 705/35 |
| 2008/0010198 A1 | * | 1/2008 | Eliscu ............................. 705/40 |
| 2009/0006183 A1 | * | 1/2009 | Paintin et al. ................... 705/10 |
| 2009/0150287 A1 | * | 6/2009 | Campbell et al. ............... 705/44 |
| 2009/0248465 A1 | | 10/2009 | Recce |
| 2010/0094774 A1 | * | 4/2010 | Jackowitz et al. .......... 705/36 R |

(Continued)

FOREIGN PATENT DOCUMENTS

EP        1091328 A2 *  4/2001
EP        1102222 A2 *  5/2001

*Primary Examiner* — Jacob C. Coppola
(74) *Attorney, Agent, or Firm* — Banner & Witcoff, Ltd.; Michael A. Springs

(57) ABSTRACT

Systems and methods for providing content to a user at an account accessing device is described A first user input may be received at a first account processing device. A type of channel between the user and the account accessing device, a temporal parameter associated with the first access, user used financial entity services associated with at least one account of the user and current allowable actions on the first account by the user may be determined. A second user input may be received indicating an action, of the current allowable actions, of the user at the first account accessing device. Content for output to the user upon another occurrence of the user accessing the first account accessing device may be determined. The content may be based upon at least one behavioral characteristic of the user and may be an offer for at least one user unused financial entity service.

20 Claims, 9 Drawing Sheets

(56) References Cited

U.S. PATENT DOCUMENTS

2011/0131131 A1 6/2011 Griffin et al.
2011/0178909 A1* 7/2011 Benefield et al. ............... 705/35
2012/0265809 A1* 10/2012 Hanson et al. ................ 709/204

* cited by examiner

CONTENT DISTRIBUTION UTILIZING ACCESS PARAMETER DATA

CROSS-REFERENCE TO RELATED APPLICATIONS

This application is related to U.S. patent application Ser. No. 13/104,564, filed May 10, 2011 and entitled "Identification of Customer Behavioral Characteristic Data,".

BACKGROUND

Customer satisfaction and maintaining customer loyalty are two metrics that a company may watch to ensure stability. In certain industries, these two metrics help to ensure that a company continues to grow. In general, a company is always looking to keep its customers happy with respect to services and/or products that it provides.

For a financial entity, customers have many different companies that they may utilize for their respective banking needs. Product offerings for services and/or products by a financial entity may entice a customer to utilize such a financial entity associated with a desired product and/or service and/or may help maintain a customer currently with such a financial entity offering such a product and/or service. Manners for providing more options to a customer and/or keeping a customer happy are consistently desired.

SUMMARY

In light of the foregoing background, the following presents a simplified summary of the present disclosure in order to provide a basic understanding of some aspects of the present disclosure. This summary is not an extensive overview of the present disclosure. It is not intended to identify key or critical elements of the present disclosure or to delineate the scope of the present disclosure. The following summary merely presents some concepts of the present disclosure in a simplified form as a prelude to the more detailed description provided below.

Aspects of the present disclosure relate to a system and method for identifying one or more customer behavioral characteristics based on data received from one or more sources. In some examples, the system and method include receiving customer data from a first source. The customer data may include a current access parameter and a plurality of previous access parameters. A pattern may be identified in the current access parameter and previous access parameters. In some arrangements, customer data may be received from a second data source different from the first data source. A second current access parameter and second plurality of previous parameters may be received. A pattern may be identified between the second current access parameter and the second previous parameters. The identified patterns may be compiled to identify one or more customer behavioral characteristics.

Aspects of the present disclosure are directed to a method and system for providing content to a user at an account accessing device A first user input may be received at a first account processing device. A type of channel between the user and the account accessing device, a temporal parameter associated with the first access, user used financial entity services associated with at least one account of the user and current allowable actions on the first account by the user may be determined. A second user input may be received indicating an action, of the current allowable actions, of the user at the first account accessing device. Content for output to the user upon another occurrence of the user accessing the first account accessing device may be determined. The content may be based upon at least one behavioral characteristic of the user and may be an offer for at least one user unused financial entity service.

Aspects of the present disclosure may be provided in a non-transitory computer-readable medium having computer-executable instructions to perform one or more of the process steps described herein.

These and other aspects of the embodiments are discussed in greater detail throughout this disclosure, including the accompanying drawings.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments in which the disclosure may be practiced. It is to be understood that other embodiments may be utilized and structural and functional modifications may be made.

Various aspects described herein may be embodied as a method, a data processing system, and/or a computer program product. Accordingly, those aspects may take the form of an entirely hardware embodiment, an entirely software embodiment and/or an embodiment combining software and hardware aspects. Furthermore, such aspects may take the form of a computer program product stored by one or more non-transitory computer-readable storage media having computer-readable program code, or instructions, embodied in or on the storage media. The term "computer-readable medium" or "computer-readable storage medium" as used herein includes not only a single medium or single type of medium, but also a combination of one or more media and/or types of media. Such a non-transitory computer-readable medium may store computer-readable instructions (e.g., software) and/or computer-readable data (i.e., information that may or may not be executable). Any suitable computer readable media may be utilized, including various types of tangible and/or non-transitory computer readable storage media such as hard disks, CD-ROMs, optical storage devices, magnetic storage devices, and/or any combination thereof.

Aspects of the method steps disclosed herein may be executed on one or more processors on a computing device 101. Such processors may execute computer-executable instructions stored on non-transitory computer-readable media. The disclosure may also be practiced in distributed computing environments where tasks are performed by remote processing devices that are linked through a communications network. In a distributed computing environment, program modules may be located in both local and remote computer storage media including memory storage devices.

Figure 1:
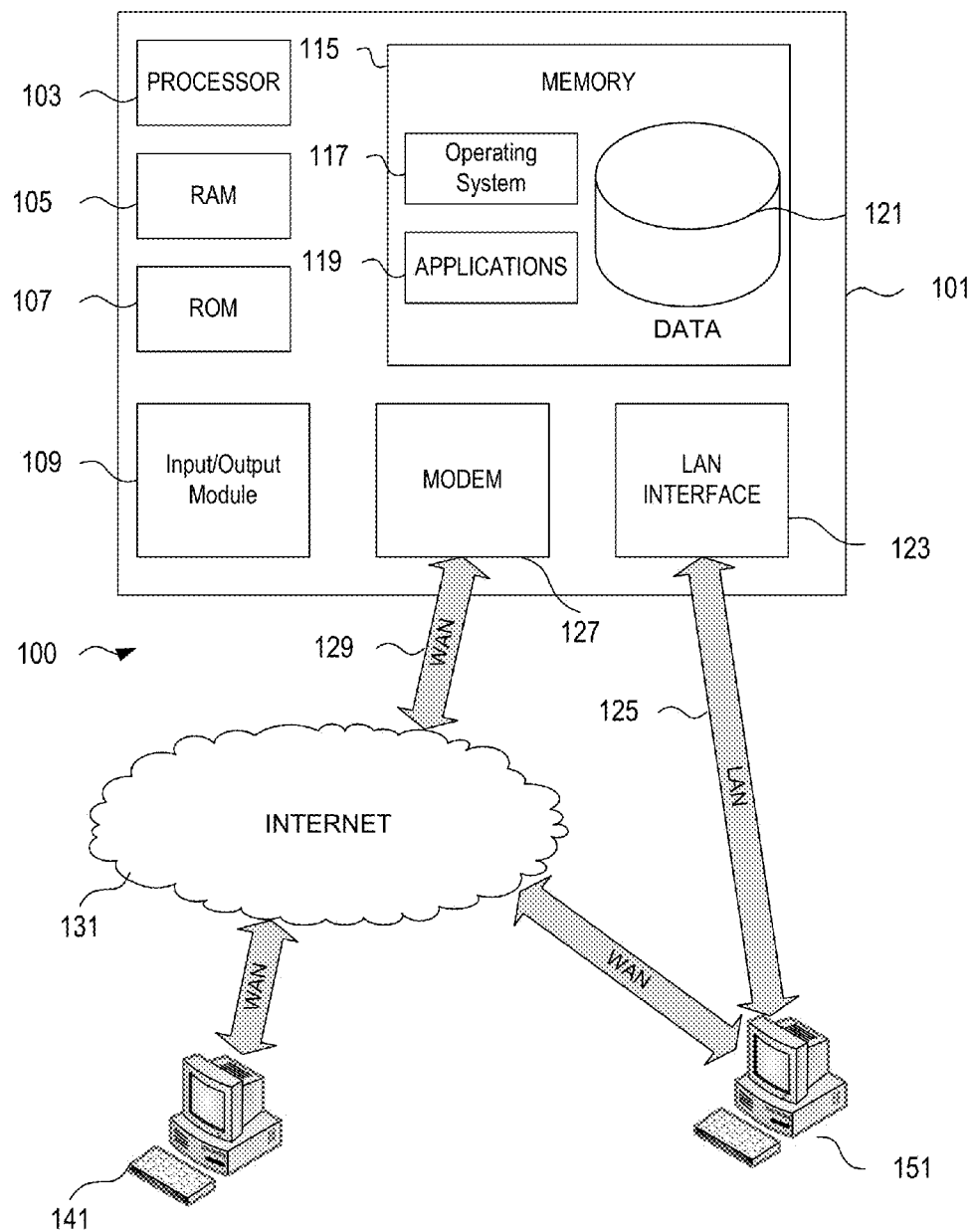
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computing device 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of computing device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with individuals, allowing interoperability between different elements of the business residing at different physical locations.

The computing device 101 may operate in a networked environment supporting connections to one or more remote computers, such as terminals 141 and 151. The terminals 141 and 151 may be personal computers or servers that include many or all of the elements described above relative to the computing device 101. The network connections depicted in FIG. 1 include a local area network (LAN) 125 and a wide area network (WAN) 129, but may also include other networks. When used in a LAN networking environment, the computing device 101 is connected to the LAN 125 through a network interface or adapter 123. When used in a WAN networking environment, the computing device 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
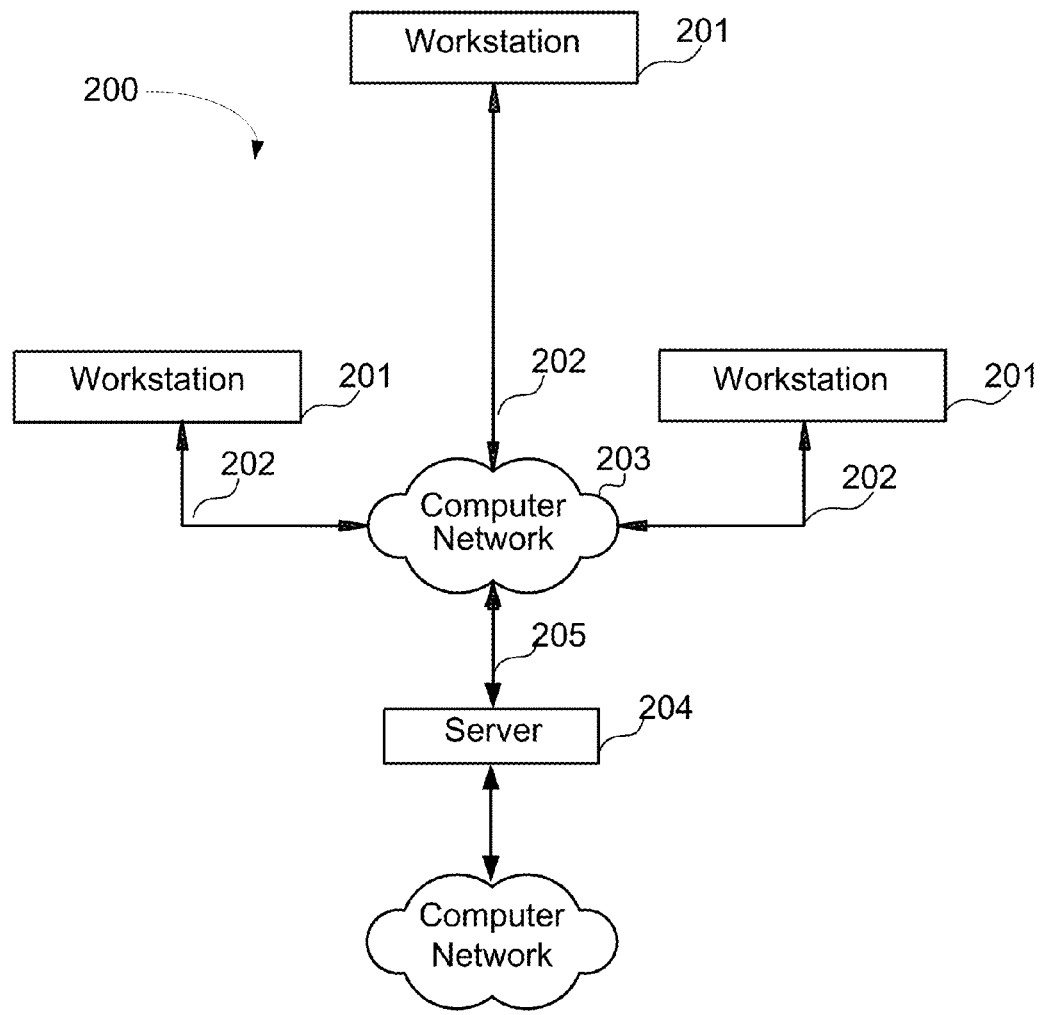
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

The steps that follow in the Figures may be implemented by one or more of the components in FIGS. 1 and 2 and/or other components, including other computing devices.

Figure 3:
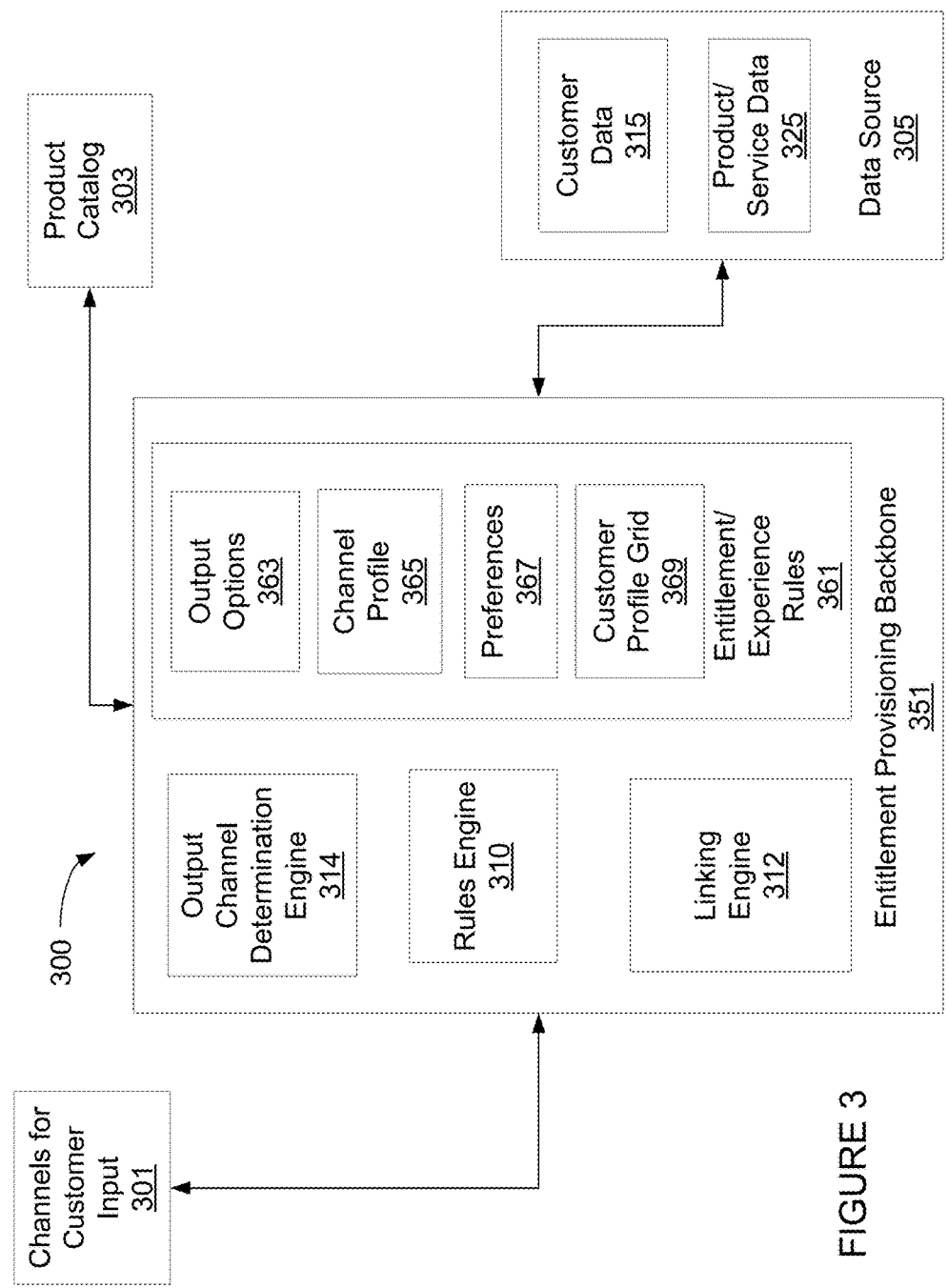
FIG. 3 shows a block diagram of a system for identifying and utilizing customer behavioral characteristics in accordance with at least one aspect of the present disclosure.

FIG. 3 shows a block diagram of a system for identifying and utilizing customer behavioral characteristics in accordance with at least one aspect of the present disclosure. The system 300 may include one or more channels for customer input 301 (e.g. into an entitlement provisioning backbone 351 as described more fully herein). In some examples, the channels for customer input 301 may include one or more methods of conducting transactions with an entity, such as a financial institution. For instance, the channels for customer input 301 may include automated teller machines (ATMs), on-line banking interfaces, mobile banking interfaces, in-person banking (e.g., transactions via a banking associate) and the like.

In addition to customer input into the entitlement provisioning backbone 351, a product catalog 303 also may be provided. The product catalog may include one or more products or services associated with the financial institution. Product catalog 303 may be configured to include products or services for a particular type of account, such as a checking account, savings account, or mortgage loan account, and/or all products or services offered. Still further, product catalog 303 may include data in categories with subcategories. For example, a category may be a checking account. In such an example, the subcategory may be, a debit card associated with the checking account, an interest rate offering associated with the checking account when a customer opens a savings account, online banking parameters associated with the checking account, and the like. As such, product catalog 303 may include data for one or more products and services of the financial entity, whether or not a customer is enrolled in and/or utilizes each and every product and/or service. As should be understood, product catalog 303 may be one or more different databases and/or memories including data with respect to product offerings of the financial entity.

In addition, customer data from one or more sources, such as data source 305, may be connected to the entitlement provisioning backbone 351. The data source 305 may include customer data 315, such as customer name or other identifier, personal identification number or other authenticator, account information such as account number, and others. The data source 305 may also include product and/or service data 325. The product and/or service data 325 may include information related to one or more customers and the products and/or services they subscribe to or use within the financial institution. Some examples of products and/or services may include types of accounts, online bill pay, automatic bill pay, and the like. In some examples, the data source 305, and associated customer data 315 and product/service data 325, may be specific to a particular customer input channel. For instance, the data source 305 may include data receive and stored from transactions occurring at ATMs, online banking, and the like. Additional information about various data sources that may be used with the entitlement provisioning backbone 351 will be described more fully below.

The entitlement provisioning backbone 351 may be used to identify one or more customer behavioral characteristics and, in some instances, identify products or services to offer a customer based on the identified characteristics. The entitlement provisioning backbone 351 may receive inputs from one or more of the various sources described above, such as data sources, customer channel inputs, product catalog, and the like. The entitlement provisioning backbone 351 may include one or more rules engine(s) 310. The rules engine 310 may include one or more rules defined (such as by an administrator) to identify patterns in data received by the entitlement provisioning backbone 351 in order to identify one or more customer behavioral characteristics. For instance, the entitlement provisioning backbone 351 may receive customer data from one or more sources, such as data source 305. This data may include current access parameters that may include data associated with a current or most recent transaction, and also may include historical data, such a previous access parameters. The previous access parameters may include transaction data from a previous predetermined time period (e.g., 3 months, 6 months, 1 year, and the like), from a predetermined prior data range (e.g., mm/dd/yyyy to mm/dd/yyyy), or from a previous predetermined number of transactions. The rules engine 310 may identify one or more patterns in the current access parameter and previous access parameters. Identification of patterns is discussed more fully herein.

The entitlement provisioning backbone 351 may further include one or more linking engine(s) 312. The linking engine may, in some examples, link the received customer data from the one or more data sources, such as data source 305, with the rules defined in the rules engine 310. This linking may aid in identifying patterns in the current and previous access parameters, and may aid in identifying one or more customer behavioral characteristics. Still further, linking engine 312 may include one or more algorithms for linking various types of access parameters with other types of access parameters. For example, a time and a place of an access to an account accessing device may be needed. Linking engine 312 may provide an indication for rules engine 310 to associate time of an access with the place of the access. As part of the process for determining one or more patterns, rules engine 310 may utilize linking engine 312 for processing of data in order to identify one or more customer behavioral characteristics.

The entitlement provisioning backbone 351 may also include an output channel determination engine 314. The output channel determination engine 314 may identify one or more channels on which to output information to a customer. For instance, upon identification of a customer behavioral characteristic, one or more content items may be identified for the customer, as described herein. In some examples, the content items may include an offer of one or more products or services that may be of interest to the customer based on the identified customer behavioral characteristic. Accordingly, this content item may be presented to the customer on one or more channels, such as via ATM, online banking, mobile banking, and the like, as determined by the output channel determination engine 314. For example, is an example where a customer utilizes an ATM, content for rendering to the customer may be displayed on a monitor associated with the ATM. Output channel determination engine 314 may determine that transmission of the content for rendering should be to an ATM that the customer is currently utilize. Alternatively, although the customer made utilizing an ATM for a transaction, output channel determination engine 314 may determine that transmission of content for the user is to be sent by way of a mobile terminal interface transmission, such as a cellular network.

Entitlement/experience rules 361 may include data that is retrieved and/or sent as needed throughout the system. Entitlement/experience rules 361 interacts with one or more of components output channel determination engine 314, rules engine 310, linking engine 312, and/or other components. Entitlement/experience rules 361 may be configured to include one or more components with respect to customer data, interface data, and/or third-party data. Output options 363 may provide a listing of all possible manners for outputting content to a user. Output options 363 may be utilized in conjunction with output channel determination engine 314 in order to allow output channel determination engine 314 to know the one or more output options available to it for transmission of content to a user. Output channel determination engine 314 may be configured to utilize options available in output options 363 for determining what type of channel content should be transmitted to the user.

Channel profile 365 may provide data with respect to one or more channels for interfacing with a user. Channel profile 365 may be utilized in conjunction with output options 363 and/or output channel determination engine 314 in order to determine the appropriate channel for output of content to a user. Channel profile 365 may include data with respect to connection speed for a web based access interface configuration, latency data with respect communication with an account accessing device such as an ATM, and/or other data associated with the channel, for example the geographic location of an account accessing device, such as an ATM. Preferences 367 may provide data with respect to one or more configuration preferences for output of content to a user. Preferences 367 may include data with respect to preferences of a financial entity providing content to the user. For example, with no preferred manner for distribution of content to a user identified by the user, preferences 367 may be utilized to determine that the financial entity associated with the entitlement provisioning backbone 351 desires to first transmit content via the same manner of channel that the customer is utilizing currently. As such, if the customer is accessing an ATM, preference 367 may be utilized to determine that the financial entity would prefer content distributed to the same ATM. Preferences 367 may be utilized with one or more of channel profile 365, output options 363, and/or output channel determination engine 314. Preferences 367 may include other preferences of the financial entity operating and entitlement provisioning backbone 351. For example, preferences 367 may include different preferences for different types of access. If a customer is accessing a checking account, preferences 367 may indicate a preference of the financial entity for output of content associated with a new product in comparison to an old product offering. Any of a number of different preferences of the financial entity may be included herein.

Customer profile grid 369 may provide data with respect to one or more categories of customers. Customer profile grid 369 may include generalization data with respect to categories of people that may be utilized for determining output of content to a customer. This generalization data may include information of a customer base associated with a particular geographic region, such as an average financial income, an average home mortgage balance, an average use of a particular ATM at a particular location, and/or other general customer profile information. Customer profile grid 369 may be utilized with one or more of channel profile 365, output options 363, preferences 367, and/or output channel determination engine 314.

Figure 4:
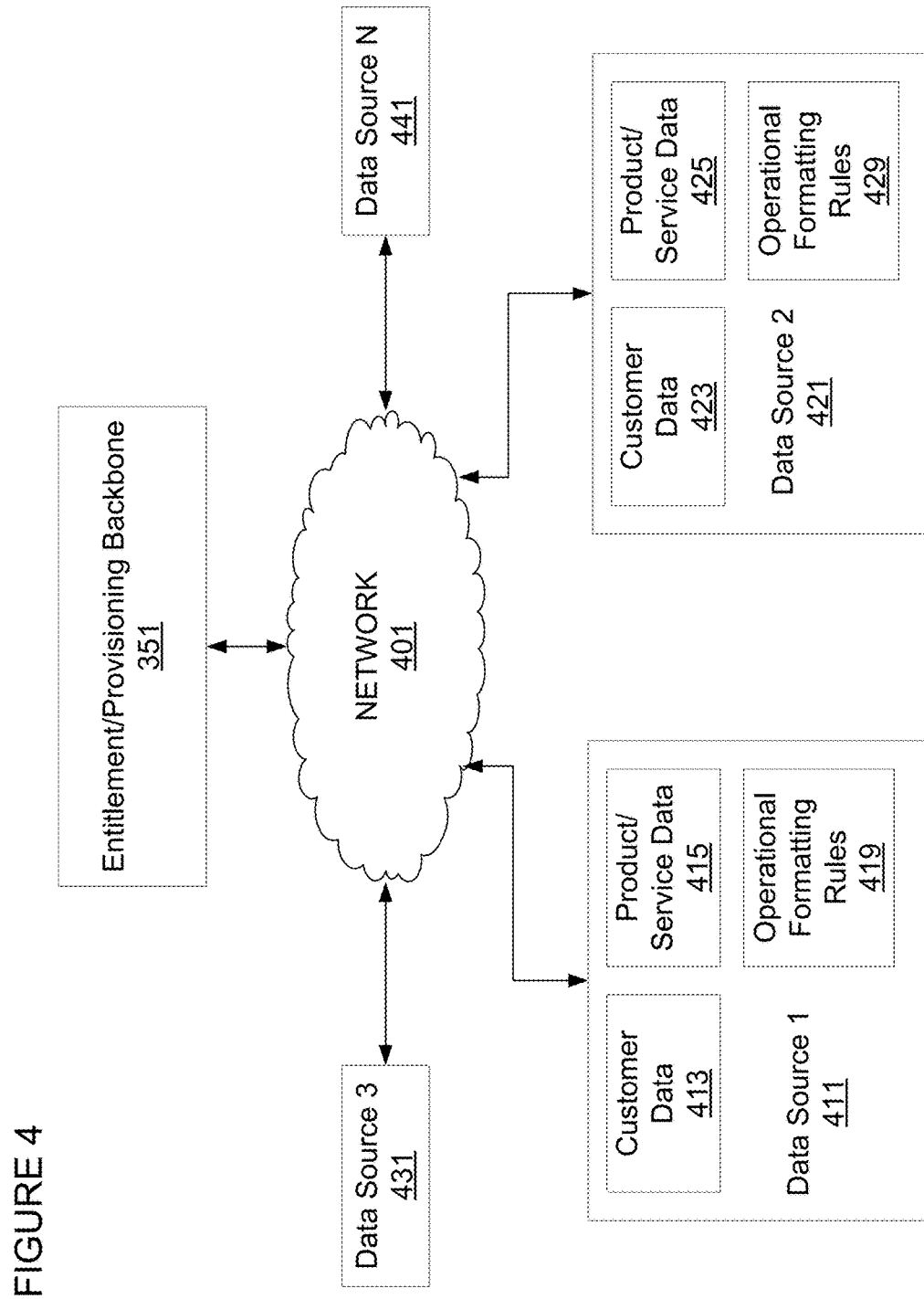
FIG. 4 shows a block diagram of a system for acquiring and maintaining data with respect to customers from a plurality of different sources in accordance with at least one aspect of the present disclosure.

FIG. 4 shows a block diagram of a system for acquiring and maintaining data with respect to customers from a plurality of different sources in accordance with at least one aspect of the present disclosure. In some examples, an entitlement provisioning backbone (e.g., 351 in FIG. 3) may be connected to one or more data sources, such as data sources 411, 421, 431 and/or 441. The entitlement provisioning backbone 351 may be connected to the one or more data sources 411, 421, 431, 441 via a network, such as network 401. The network may be the Internet, an intranet, or any other suitable network. Although four data sources 411, 421, 431, 441 are shown in FIG. 4, more or fewer data sources may be used without departing from the present disclosure. Further, in some examples, one or more data sources may be associated with or internal to an entity using the entitlement provisioning backbone, such as a financial institution, and may include data collected by or stored within the financial institution. For instance, some example data sources may include automated teller machines (ATM) and transaction/customer information associated therewith, on-line banking customer and transaction information, mobile banking customer and transaction information, general customer information, in-person transaction information, and the like. Additionally or alternatively, one or more data sources may be external to the entity or financial institution. For instance, one or more data sources may be general data for one or more customers that may have been purchased or otherwise obtained by the entity or financial institution, or it may be customer data associated with another financial institution that has been obtained by the entity or financial institution for use in identifying one or more customer behavioral characteristics, as will be discussed more fully below. This outside or external data may include information about customers such as shopping habits, driving habits, eating habits, financial transactions at other financial institutions, and the like.

In some examples, the one or more data sources may include various modules associated with each data source. For instance, data source 1 411 may include a plurality of modules within the data source 411. The data source 411 may include customer data 413, product or service data 415, and/or operational formatting rules 419.

In one example, data source 1 411 may include data collected from transactions conducted at one or more ATMs. Accordingly, as transactions are conducted at ATMs customer information, as well as transaction information may be stored. Customer data may be stored in customer data module 413 and may include one or more access parameters such as: customer name or other identifier, personal identification number, address, and/or account history with the financial institution. Product or service data associated with the customer and/or transactions may be stored in product or service data module 415. This module may include access parameters such as type of account, type of transaction, and the like. In some examples, this data module may store one or more current access parameters obtained from a current transaction (e.g., a transaction being conducted by the customer at an ATM at the current time) and also may store one or more previous access parameters that may include historical information including transaction type, account type, amount of transaction, and the like from previous transactions. The length of time or number of historical transactions stored may vary and may be predetermined, such as by an administrator. For instance, the product or service module 415 may store historical information for the previous 100 transactions, 150 transactions, or other numbers and/or may store transactions from the past 6 months, 1 year, 5 years, and the like. In some arrangements, a portion of the data stored in data source 411 may be third party data or other data not generally associated with the financial institution.

The data source 411 may also include operational formatting rules module 419. The operational formatting rules module 419 may include formatting rules for any data associated with data source 411. For instance, the ATM data may be formatted to a generic format such that the ATM data may be compiled with data from other data sources (e.g., data source 2 421, data source 3 431, data source n 441, and others) that may include on-line banking data, mobile banking data, in-person banking data, outside data, etc. Compilation and/or manipulation of the data associated with the data sources 411, 421, 431, 441 will be discussed more fully below.

As discussed above, a pattern may be identified between data associated with a current access parameter, such as current transaction data, current customer data, or other data as disclosed herein, and the historical data which may include a plurality of previous access parameters. In some examples, this pattern may be identified by the entitlement provisioning backbone 351. In some examples, patterns may be identified between data stored at multiple data sources, as will be discussed below.

Other data sources, such as data source 2 421, may include data stored received and stored from another channel of performing transactions. For instance, although data source 411 is discussed in the context of ATM data, any data source indicated may receive and stored data from the various channels of transactions, including at least ATMs, on-line banking, mobile banking, in-person banking (e.g., via a banking associate), and the like. Accordingly, in continuing the example above, if data source 1 411 includes data from ATM transactions, data source 2 421 may include data from another channel, such as on-line banking transactions. Accordingly, data source 421 may include customer data module 423 which may include customer data related to on-line banking transactions, including, for instance, customer name or identifier, personal identification code or other authenticator, and the like.

Data source 421 may further include product or service data module 425. The product or service data module may include information regarding products or services associated with the customer and various on-line banking products or services. For instance, the module 425 may include accounts associated with on-line banking, on-line services such as bill-pay, electronic notifications, electronic statements, and the like. Similar to data source 411, data source 421 may include operational formatting rules module 429 which may include rules for formatting data in order to compile the data with data from other sources (e.g., data from ATMs, mobile banking, and the like).

Figure 6A:
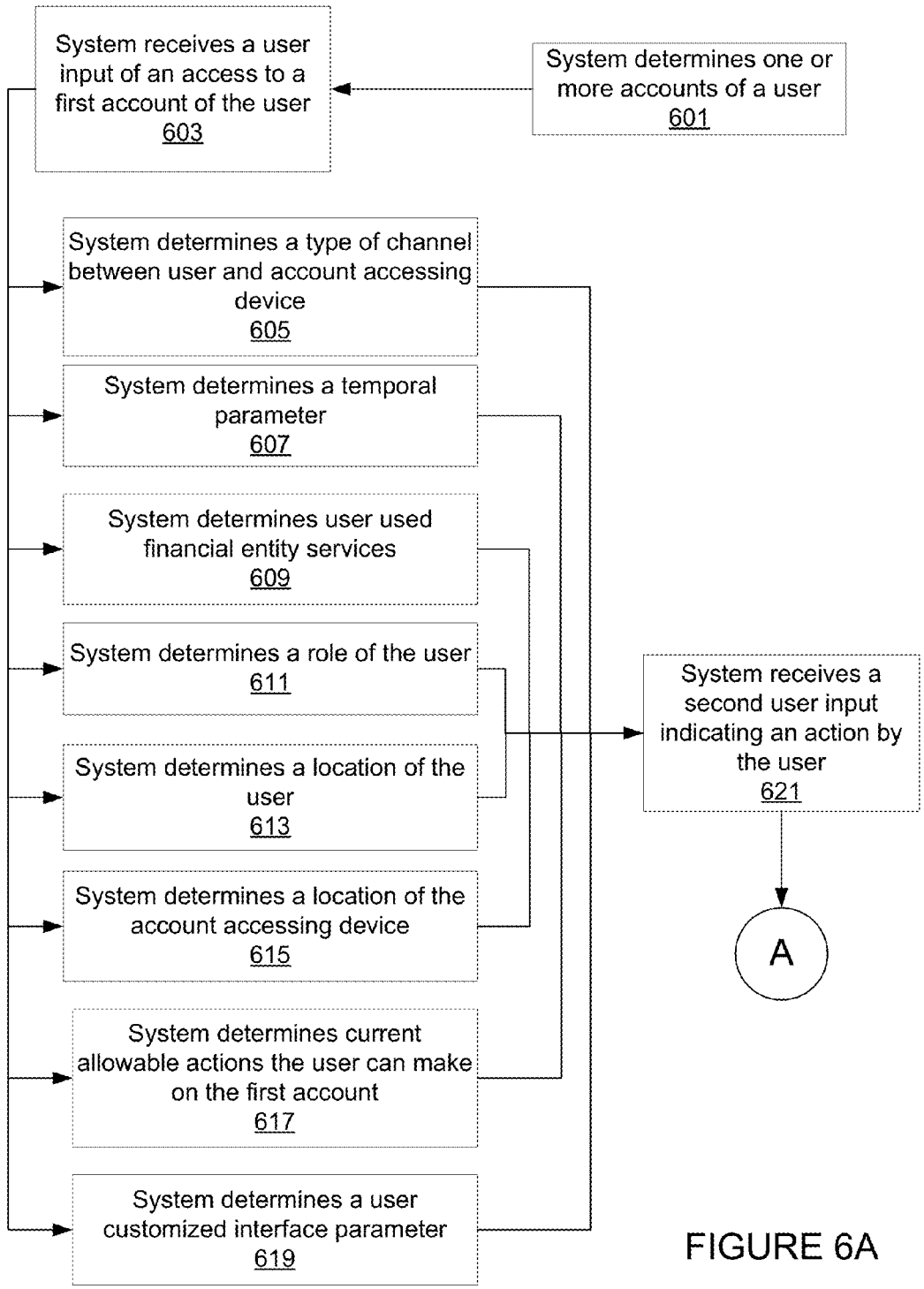
FIG. 6 shows a flow chart of an illustrative method for determining content to present to a user in accordance with at least one aspect of the present disclosure.

FIG. 6 shows a flow chart of an illustrative method for determining content to present to a user in accordance with at least one aspect of the present disclosure. The process starts and at 601, the system may determine one or more accounts of the user. The system may be the entitlement provisioning backbone 351 as described herein with respect to FIGS. 3 and 4. As described herein, a user may have any of a number of different accounts associated with a financial entity. For example, a user may have a checking account, savings account, a money market account, a home equity loan account, and an investment account. Still further, the user may have access to different accounts, even those accounts in which she is not an owner. For example, the user may be a trustee of an account. As such, the system may determine those accounts in which the user is owner, is co-owner, is trustee, is guarantor, is reviewer only, and/or has other access rights.

Proceeding to 603, the system may receive a user input of an access to a first account of the user. The first account of the user would be one of the determined accounts from 601. The first account would be an account associated with the financial entity. The user input of the access to the first account of the user may correspond to a selection by the user for more information with respect to the first account. For example, a user may enter via an ATM display screen a request to access data with respect to her checking account, e.g., the first account of the user. Any of a number of other manners for user input may be utilized including verbal commands by the user, and entry of a request via the keyboard, and entry of a request via a numeric pad on a mobile terminal, and or other manners. In this example, the received user input may originate from an account accessing device, such as an ATM.

From 603, any of a number of different data parameters associated with the access by the user may be determined. In 605, the system may determine a type of channel utilized between the user and the account accessing device. Because a user may access her account by a number of different channels, the system determines the type of channel being utilized. For example, the channel may be a web browser associated with a computing device. The user may have an online banking system and may utilize a web browser for accessing her accounts. In still other embodiments, the channel may be a mobile terminal. A user may access her accounts by use of technology associated with her mobile terminal, for example, text messaging, short messaging service (SMS), and/or multimedia messaging service (MMS). It still other examples, a user may access her account you channel that is an automated teller machine (ATM) or a kiosk. In yet other examples, the user may utilize a channel for accessing her account where the channel is a branch office of a financial entity, where the user may speak with a representative of the financial entity. In another embodiment, the user may speak with an individual and/or automated voice interface system via a phone access number.

Still further, a type of channel utilized between the user and the account accessing device may not be a specific interface. The determined type of channel may include determining a connection speed for interface between the user and the account accessing device. For example, in a situation of a user utilizing a home computer, the connection speed between the home computer and the online banking system of the financial entity may be determined for the type of channel. Still other examples include the type of channel determined as the type of browser being utilized by the user, the version of the browser being utilized by the user, the specific type of mobile terminal being utilized by the user, and/or other data.

The determination of the type of channel utilized between the user and the account accessing device may be repetitively performed for any access by the user to the account via the account accessing device. As such, for a plurality of accesses by a user to one or more of her accounts, the system may determine a plurality of types of channels being utilized. This data, as described herein, may be utilized to identify one or more customer behavioral characteristics associated with one or more accounts of the user with the financial entity.

In what may be implemented concurrently and/or simultaneously with 605, in 607, the system may determine one or more temporal parameters associated with the first access of the first account of the user at the account accessing device. Temporal data associated with access of an account accessing device may be utilized by the system in a number of manners. For example, such data may be utilized for recording the specific instance for the transaction, such as withdrawal of monetary funds from the account of the user. In keeping a record of the time and date of the withdrawal, a user may review the record for personal accounting purposes. However, other temporal parameters may be determined by the system.

For example, the system may determine that this access by the user is a very first access by the user at this account accessing device. In such an example, the user may be a new customer to the financial entity and may be accessing an ATM f of the entity or the very first time. In still other examples, the determined at least one temporal parameter may be a determination that the user is a returning customer with no known relationship, e.g., a user has not logged into the system before. As further examples, the determined least one temporal parameter may be a determination that the user is a registered customer, e.g., a customer with previously stored application and/or customer personalization data included. In yet further examples, the determined at least one temporal parameter may be a determination that the user is not a customer of the financial entity at all, such as an example where the user has a debit card associated with a first different financial entity but is utilizing an ATM of the second financial entity.

Still other data may be utilized as the determined at least one temporal parameter. The determination of the at least one temporal parameter may be repetitively performed for any access by the user to the account via the account accessing device. As such, for a plurality of accesses by a user to one or more of her accounts, the system may determine a plurality of temporal parameters. This data, as described herein, may be utilized to identify one or more customer behavioral characteristics associated with one or more accounts of the user with the financial entity.

Proceeding to 609, the system may determine financial entity services associated with at least one account of the user that the user has enrolled in and/or utilizes. Step 609 may occur concurrently and/or simultaneously with 605 and/or 607. In the example of a checking account of the user, the user may have enrolled in and/or utilized a debit card associated with the checking account. However, the user may not have physical checks issued by the financial entity that is associated with the checking account. In such an example, the user may have declined an offer by the financial entity when initially opening the checking account. As such, in this example, the identification of the debit card may be a determined financial entity service associated with at least one account of the user that the user has enrolled in and/or utilizes.

In determining these financial entity services, the system may recognize that the user has a plurality of accounts associated with the financial entity. For each of these respective accounts, the system may determine one or more financial entity services associated with the respective account that is utilized by the user and/or that the user has enrolled in. As such, although a user may be accessing an ATM in order to view details of her checking account, the system may determine one or more financial entity services associated with a savings account of the user that the user utilizes and/or is enrolled in. Additional determined financial entity services may include a type of service offered, such as a loan or line of credit, an investment account, insurance account, and/or other type of account. Still other financial entity services may include the ability to pay bills in an online environment, the ability to make transactions in an online environment, the ability to review account data utilizing text messaging technology, the ability to access a financial adviser associated with investment account, and/or other services.

The determination of the financial entity services associated with at least one account of the user that the user utilizes and/or is enrolled in may be repetitively performed for any access by the user to an account via an account accessing device. As such, for a plurality of accesses by a user to one or more of her accounts, the system may determine a plurality of financial entity services. This data, as described herein, may be utilized to identify one or more customer behavioral characteristics associated with one or more accounts of the user with the financial entity.

In 611, which also may be implemented concurrently and/or simultaneously with one or more of 605, 607, and 609, the system may determine a role of the user associated with the first account. For an account of the financial entity, a user may have a number of different roles associated with it. For example, the user may be the owner of the account, whether sole owner or co-owner with one or more other people, such as a spouse. In other examples, the user may be a trustee over an account, or a guarantor on account, or a delicate on account. In still other examples, a user may have the ability to view account information such as transactions including deposits, but she does not have the ability to take other actions with respect to the account. In further examples, the user may be an authorized or sub user of the account. For example, the user may be a minor who is a child of the account owner. The account owner in such an example may have authorized the minor to have access to the account, whether limited or unlimited. Knowing the role of the user allows the system to know what offerings may be provided to the user.

The determination of the role of the user with respect to the account may be repetitively performed for any access by the user to an account via an account accessing device. As such, for a plurality of accesses by a user to one or more of her accounts, the system may determine a plurality of roles of the user. This data, as described herein, 80 utilized to identify one or more customer behavioral characteristics associated with one or more accounts of the user with the financial entity.

Moving to 613, which may be implemented concurrently and/or simultaneously with one or more of 605, 607, 609, and/or 611, the system may determine a location of the user in accessing the account. For example, the system may determine the user location by a certain country, a state/province, and/or a zip/postal code. Still further, the system may determine the user location by other identifying data, such as a global positioning system (GPS) determination and/or an Internet Protocol (IP) address.

The determination of the user location may be repetitively performed for any access by the user to an account via an account accessing device. As such, for a plurality of accesses by a user to one or more of her accounts, the system may determine a plurality of user locations. This data, as described herein, may be utilized to identify one or more customer behavioral characteristics associated with one or more accounts of the user with the financial entity. For example, the system may determine that the customer repeatedly utilizes a specific ATM at a specific location, e.g., a specific address. This data, in combination with other data such as temporal parameter data, e.g., similar times for access by date and time, may be utilized to identify the customer behavioral characteristic, e.g., that the user accesses a specific ATM at a specific location at substantially the same time every other Friday.

Proceeding to 615, which may be implemented concurrently and/or simultaneously with one or more of 605, 607, 609, 611, and/or 613, the system may determine a location of the account accessing device. For example, the system may determine the location of an ATM that the user is using as part of the first access. The system may determine the account accessing device location by a certain country, a state/province, and/or a zip/postal code. By coupling the determined location of the account accessing device data with the determined temporal parameters and or determine user location, as described in more detail below, the system may be configured to identify a customer behavioral characteristic for use in presenting content to the user.

The determination of the account accessing device location may be repetitively performed for any access by the user to an account via account accessing device. As such, for a plurality of accesses by a user to one or more for accounts, the system may determine a plurality of account accessing device location. This data, as described herein, may be utilized to identify one or more customer behavioral characteristics associated with one or more accounts of the user with the financial entity.

In 617, which again may be implemented concurrently and/or simultaneously with one or more of 605, six of seven, 609, 611, 613, and/or 615, the system may determine one or more current allowable actions the user can make on the first account. For example, if the account is a checking account, a current allowable action may be the ability to transfer funds from and/or deposit funds into the first account. Any of a number of different current allowable actions may be associated with different accounts of the user. For example illustrative current allowable actions may include the ability to view data associated with the account, the ability to deposit funds into the account, the ability to utilize a debit card against the account, the ability to open the account, the ability to close the account, the ability to dispute a transaction associated with the account, the ability to block access to the account, the ability to transfer funds out of the account, and or other actions. A user may have different current allowable actions for different accounts. For example for a checking account, the user may have current allowable actions to deposit funds into the account via check and/or cash but not for direct deposit of monetary funds into the checking account. Alternatively, for a savings account of the user, the user may have current allowable actions to withdraw funds from the savings account and receive direct deposit of monetary funds into the checking account but not for transfer of funds from a different checking account to the savings account. Any of a number of different allowable actions may be associated with any of a number of different accounts of user. As described in more detail herein, the role of the user for an account may be utilized in determining the current allowable actions the user may take with respect to the account. Additional current allowable actions the user may take may include the ability to access a particular account of the user.

The determination of the current allowable actions on the first account by the user may be repetitively performed for any access by the user to an account via an account accessing device. As such, for a plurality of accesses by a user to one or more per counts, the system may determine a plurality of current allowable actions. This data, as described herein, may be utilized to identify one or more customer behavioral characteristics associated with one or more actions of the user with the financial entity.

In 619, which may be implemented concurrently and/or simultaneously with one or more of 605, 607, 609, 611, 613, 615, and/or 617, the system may determine one or more user customized interface parameters associated with the first account accessing device. For example, the user with respect to web browser access to an online banking application of the financial entity may have configured a layout and format for the online banking experience, such as a specific language for display to the user. The user may have configured a theme for the experience, the format of the user interface, whether for a web browser interface or an ATM interface, whether alerts should be generated in response to certain events, such as a low balance alert associated with an account, and customer authorization preferences. Still other user customized interface parameters may include customer context settings associated with an account, such as a no SPAM rule, an indication of the local weather, a listing of one or more sports scores, and/or other data.

The determination of the user customized interface parameters may be repetitively performed for any access by the user to an account via an account accessing device. For example, the user may have different preferences for different types of interfaces. As such, for a plurality of accesses by a user to one or more per counts, the system may determine plurality of user customized interface parameters. This data, as described herein, may be utilized to identify one or more customer behavioral characteristics associated with one or more accounts of the user with the financial entity.

With the determinations from one or more of 605, 607, 609 611, 613, 615, 617, and 619, 621, the system may receive a second user input indicating an action by the user. The second user input at the account processing device may indicate a first action of the determined current allowable actions of the user at the account accessing device. As described herein, any of a number of current allowable actions of the user may be determined and may be implemented by user.

Figure 6B:
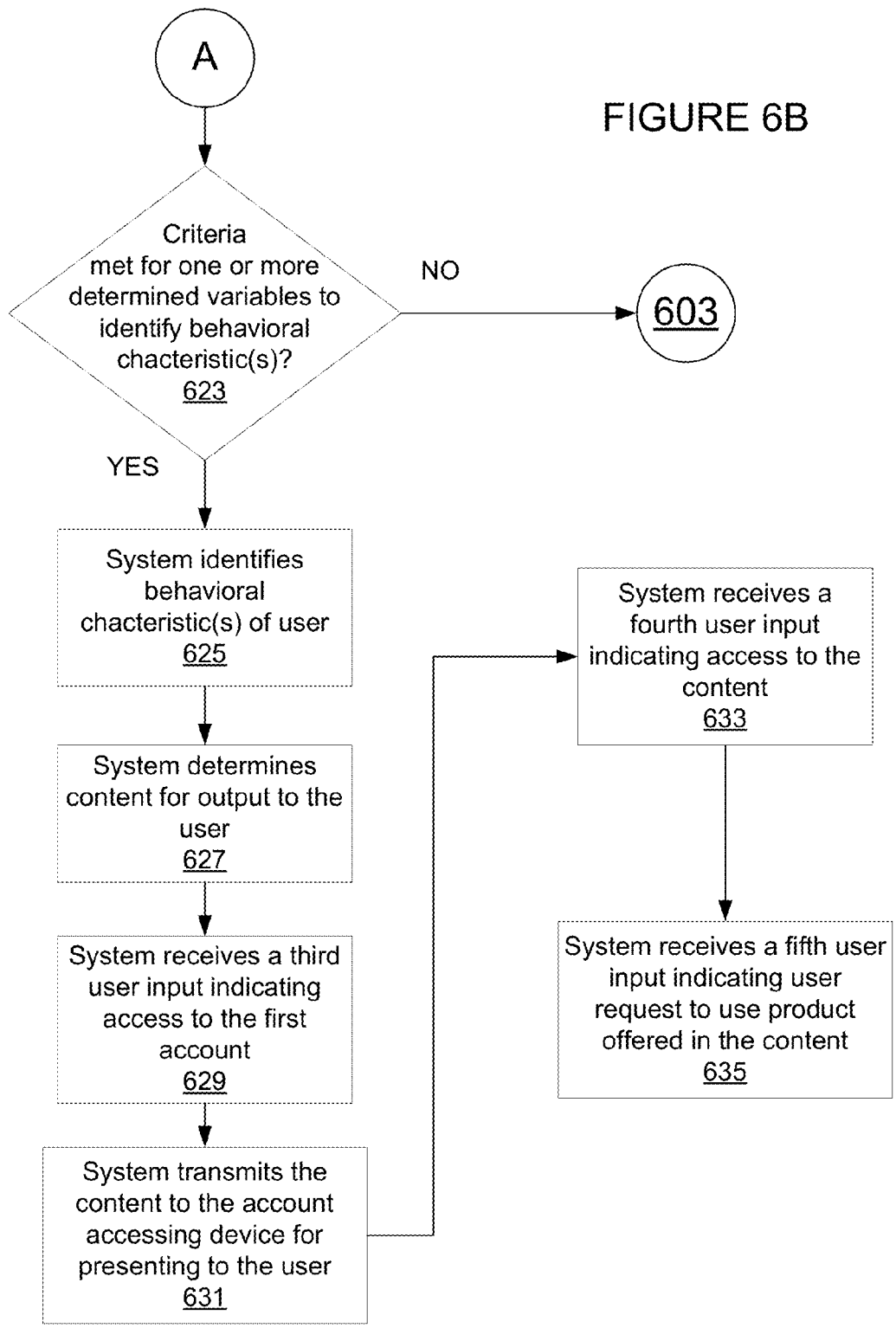

Proceeding to 623 in FIG. 6B, a determination may be made as to whether criteria has been met for one or more determined variables to identify one or more behavioral characteristics of user. If criteria has been met the process proceeds to 625 else, the process for receipts back to 603 for another access to an account by the user. Identification of one or more behavioral characteristics of a user may occur in response to a determination by the system that the user's accesses to her account(s) through one or more account accessing devices meets one or more criteria. For example, the system may determine that a user consistently deposits a check by issuing entity at a specific time and a specific place. In such an example, the user may deposit a paycheck issued by a financial entity associated with the employer of the user. The user may deposit her paycheck every other Friday on a consistent basis. Such a consistent occurrence maybe in response to the employer of the user issuing paychecks every other Friday. Therefore, the system may identify a behavioral characteristic user as the fact that the user consistently deposits a paycheck a specific ATM at a consistent time of day every other Friday. In 625, the system may identify the one or more behavioral characteristics of the user. The identification of the one or more behavioral characteristics of the user and 625 may be based upon one or more of the determinations in 605, 607, 609, 611, 613, 615, 617, and/or 619.

In 627, the system may determine content for output to the user. The content for output to the user may be upon another occurrence of the user accessing the account accessing device. This determination of content may be based upon the identified one or more behavioral characteristics of the user. Content may be at least one offer for at least one financial entity surface that the user does not use and/or is not enrolled in. For example, if the user currently does not have a debit card associated with a checking account of user, the content may be an offer to have the financial entity issue a debit card associated with the account for the user.

Proceeding to 629, the system may receive a third user input indicating access to the first account. This third user input may indicate a use of the account accessing device by user. As such, this third input may constitute another occurrence of a user accessing the account accessing device. In 631, the system may transmit the content to the account accessing device for presentation to the user. For example, if the account accessing device is a web browser interface, the system may transmit content for an offer of the financial entity for a service associated with an account of the user that the user does not currently utilize. This content may be transmitted to the web browser of the user.

In 633, the system may receive a fourth user input indicating access to the content. For example, in the previous example of a user utilizing a web browser interface, the fourth user input may be the user accessing a link within the content to create a debit card for association with the account. In 635, the system may receive a fifth user input indicating a user requests to use a product offered in the content. The fifth user input may be a user request to include the offer for the financial entity service not currently utilized by the user as one of the financial entity services associated with the account of the user with at least one current allowable action. As such, for a later occurrence of the user accessing her account, the system may have previously determined that the user did not have a debit card associated with the account analogous. Therefore, any current allowable actions associated with a debit card for the account may be determined in 617.

Figure 5A:
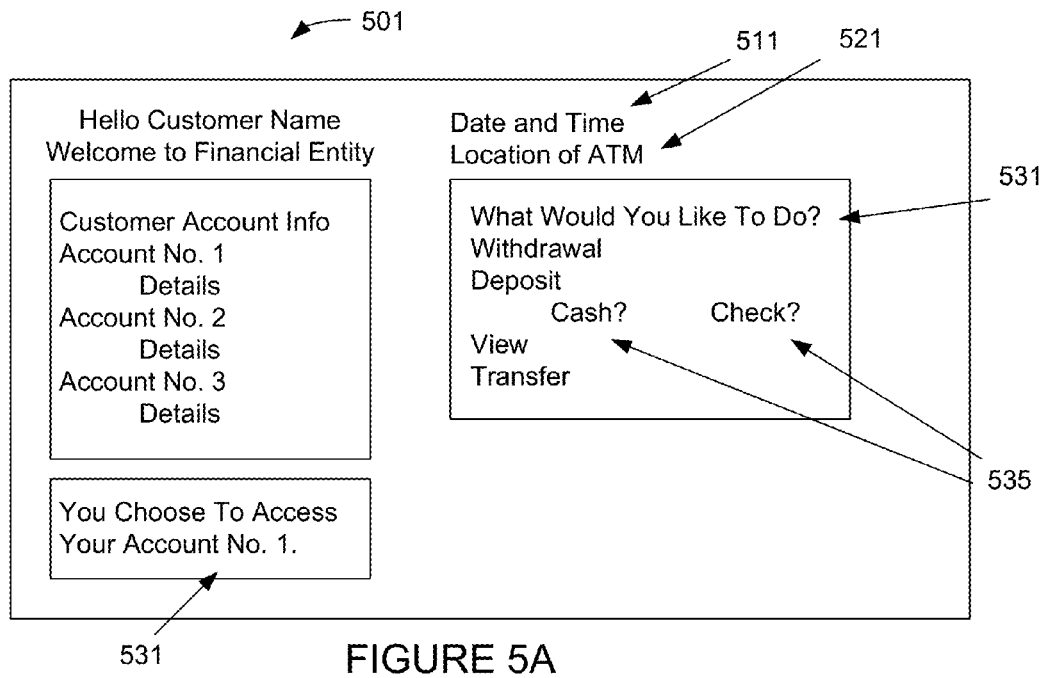
FIGS. 5A and 5B are illustrative views of a user interface determining and presenting content to a user in accordance with at least one aspect of the present disclosure.
Figure 5B:
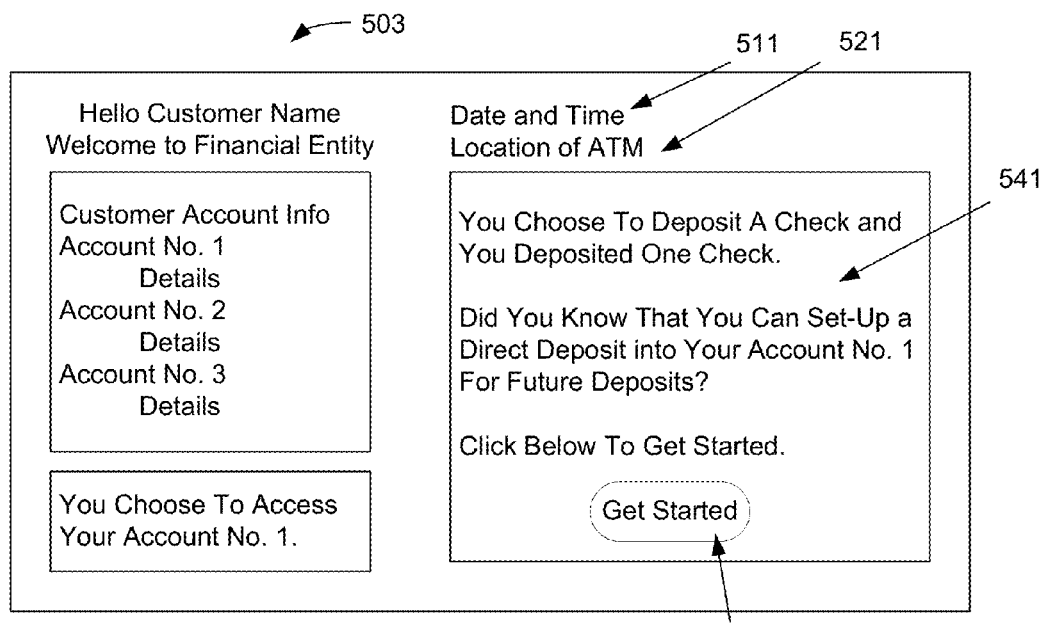

FIGS. 5A and 5B are illustrative views of a user interface determining and presenting content to a user in accordance with at least one aspect of the present disclosure. In FIG. 5A, user interface 501 may be presented to a user while the user is accessing an account accessing device. In this example the account accessing device may be an ATM. One or more temporal parameters such as the date and time 511 may be determined by the system. Still further a location of the first account accessing device such as the location of the ATM 521 may be determined by the system. Determined financial entity services associated with at least one account of the user that the user uses and/or is enrolled in 531 may be presented to the user. The at least one account of the user may be Account No. 1 as identified by 537. Still further, determined current allowable actions on Account No. 1 by the user may be presented to the user as identified by 535. In this example, the user is attempting to deposit monetary funds into her Account No. 1. Two have been determined and are presented to the user as "Cash" or "Check." User interface 503 as shown in FIG. 5B illustrates an example where the user has inputted "Check" for a monetary deposit.

As shown in user interface 503, content 541 may be outputted to a user. In this example, content 541 includes an offer to the user to set up direct deposit of monetary funds into the Account No. 1 of the user for future deposits. A link 545 may be included for the user to access to initiate the process for adding such a service to her account. As such, for another instance in which the user is accessing the ATM, dear user may be able to perform other allowable actions in response to adding direct deposits to her account.

Figure 7:
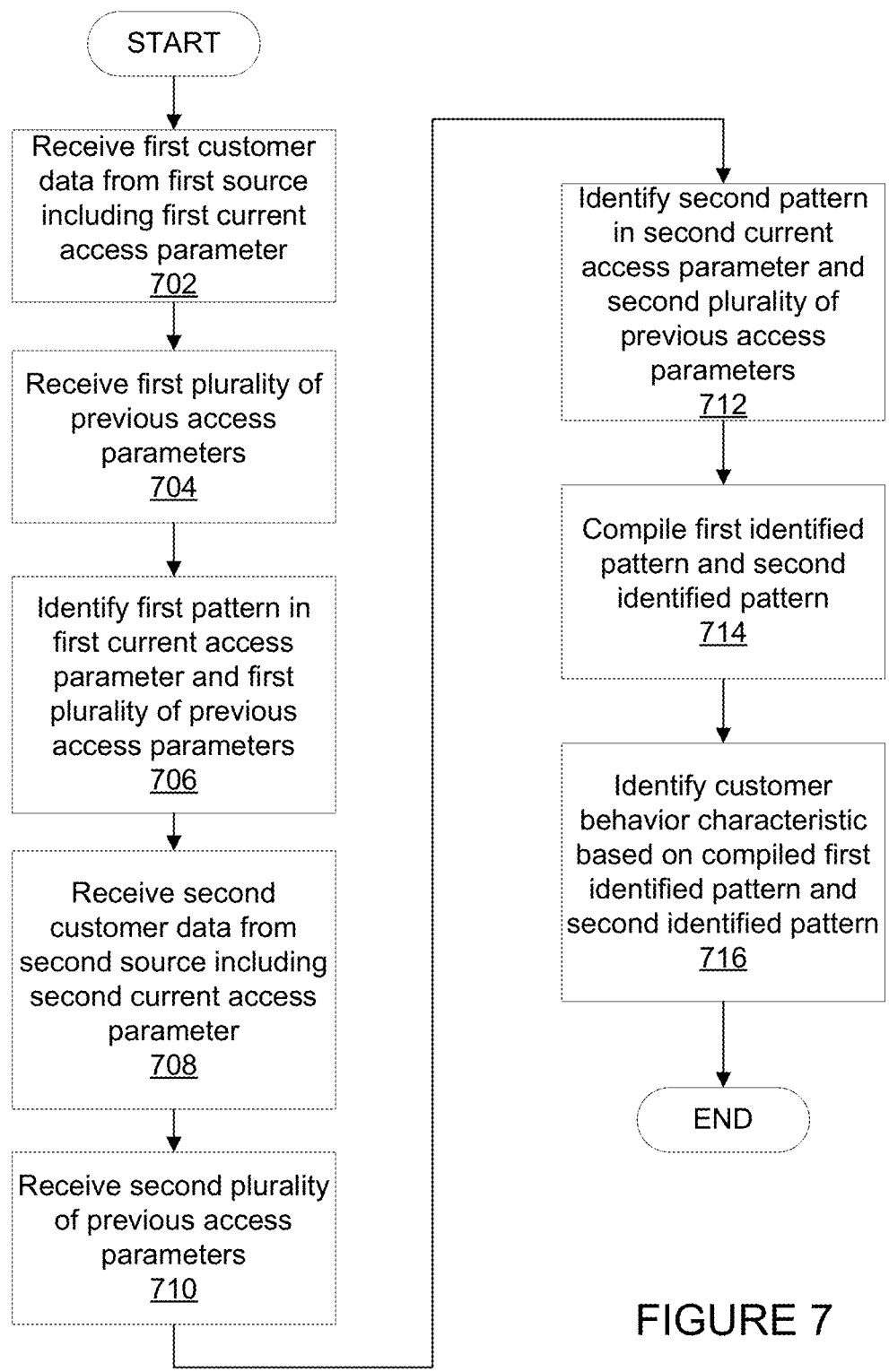
FIG. 7 is an example method of identifying a customer behavior characteristic based on one or more identified patters in accordance with at least one aspect of the present disclosure.

FIG. 7 illustrates one example method of identifying a customer behavioral characteristic according to at least one aspect of the present disclosure. Identification of a customer behavioral characteristic may, in some examples, be based data from one or more data sources. For instance, identification of a customer behavioral characteristic may be performed based on data from various sources internal to the financial institution, such as ATM data, on-line banking data, and others, as well as one or more external sources.

In step 702, first customer data for a first customer is received from a first data source. The first customer data may, in some examples, be received by a customer service system such as the systems described herein. The first data source may, in some arrangements, be associated with a financial institution. For instance, the first data source may store data associated with the financial institution or transactions associated with the financial institution. The first customer data may include a first current access parameter. As discussed above, the current access parameter may be data associated with a current transaction, such as customer data or transaction information associated with an on-line transaction being conducted, an ATM transaction being conducted, and the like. The first current access parameter may be associated with an account of the customer.

In step 704, a first plurality of previous access parameters of the account of the first customer is received. In some arrangements, step 704 may occur concurrently with, before or after step 702. As discussed above, the plurality of previous access parameters may include historical data associated with customers, transactions, and the like from the first source.

In step 706, a first pattern may be identified between the received first current access parameter and the received first plurality of previous access parameters. For instance, a pattern of behavior for the first customer may be identified. Step 706 may occur after steps 704 and 702 or may occur concurrently with the later occurring of steps 702 or 704. In one example, the first source may be data received and stored from on-line banking transactions. The current access parameter may be a customer's use of on-line bill payment to pay a bill for a specified amount on a certain day of the month. The received plurality of previous access parameters may include payments for the same or substantially similar amounts (e.g., within a predefined threshold limit) on the same day of one or more previous months. Accordingly, a pattern of payment of the specified amount on the same day of a month may be identified.

In step 708, second customer data for the first customer may be received from a second source different from the first source. The second customer data may include a second current access parameter of the account of the first customer. That is, the second current access parameter may be an access parameter of another transaction, such as an ATM transaction. In some examples, the second source may be associated with the financial institution and may, in some arrangements, be located remotely from the first source. In continuing the above example, if the first source includes data received and stored associated with on-line banking transactions, the second source may be associated with data from ATM transactions.

In step 710, a second plurality of previous access parameters may be received. Step 710 may occur concurrently with, before or after step 708. As discussed above, the previous access parameters may include data associated with the first customer and one or more historical transactions.

In step 712, a second pattern may be identified between the second current access parameter and the second plurality of previous access parameters. Step 712 may occur after steps 708 and 710 or may occur concurrently with the later occurring of steps 708 or 710. In continuing the above example, the second current access parameter may include deposit of a check for a specified amount at a particular ATM. The plurality of previous access parameters may include deposit of a check for the same or substantially similar amount (e.g., within a predefined threshold) at the same ATM. Accordingly, a pattern may be identified that a check of the specified amount is deposited in the same location ATM on a recurring basis.

In step 714, the first identified pattern and second identified pattern may be compiled. In some examples, the data may be formatting to allow for such compilation. For instance, operating and formatting rules modules (e.g., module 419 in data source 1 411) may format data from the first source so that it can be combined with data from the second source which may have been formatted by an operating and formatting module (e.g., module 429 in FIG. 4).

In step 716, a customer behavioral characteristic may be identified based on the compiled first identified pattern and second identified pattern. To continue the example above, the recurring on-line payment pattern and the recurring ATM deposit pattern may be combined to determine a customer behavioral characteristic such as, the customer uses on-line bill payment but does not automate payments, the customer does not use direct deposit, and the like. The customer behavioral characteristic may then be used to, in some examples, identify products or services to offer a customer, as discussed more fully herein.

Figure 8:
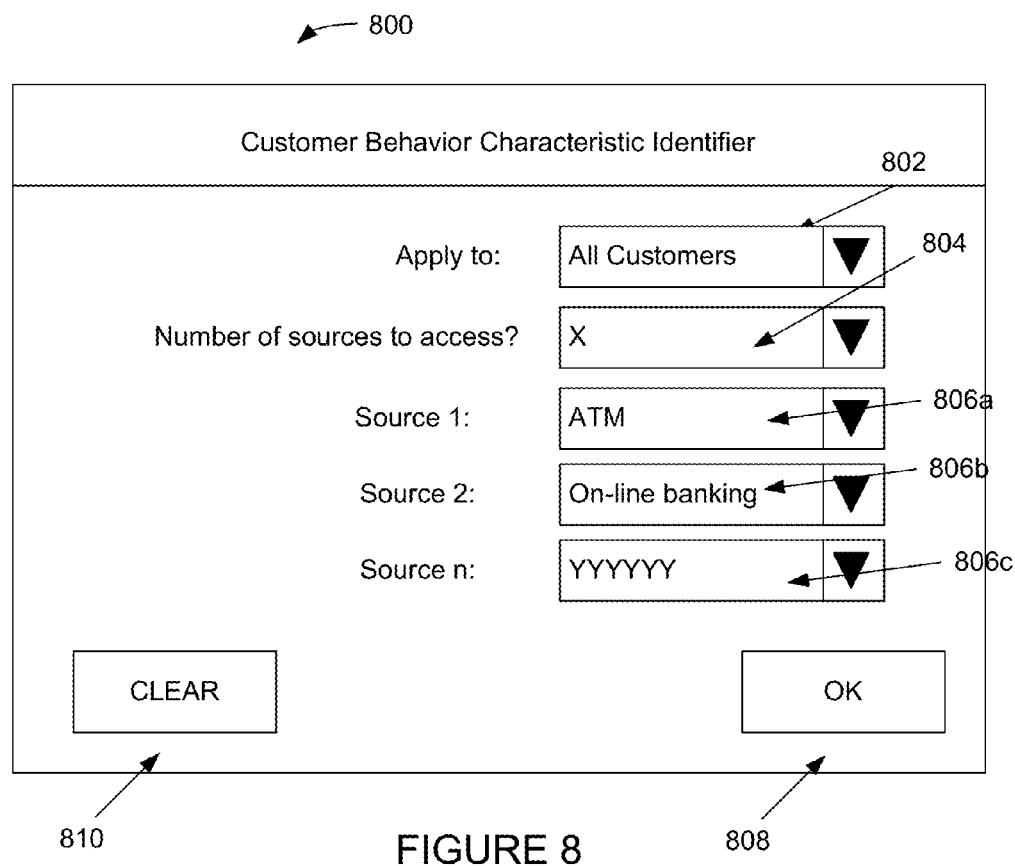
FIG. 8 is an example user interface for identifying one or more sources of data to use in identifying a customer behavior characteristic in accordance with at least one aspect of the present disclosure.

FIG. 8 illustrates one example user interface for identifying one or more sources of data for use in identifying a customer behavioral characteristic, as described in FIG. 7. The user interface 800 may include field 802 which may identify customers or a subset of customers to which the behavioral characteristic identifier may be applied. For instance, in some arrangements, all customers may be included in identifying one or more customer behavioral characteristics, as shown in field 802. Alternatively, a subset of customers may be identified, such as customers having a relationship with the financial institution of a predetermined minimum of time, customers meeting a threshold amount of money in one or more accounts with the financial institution, and the like. The customer group may, in some examples, be selected from a drop-down menu of choices. Additionally or alternatively, the desired customer group may be typed into field 802 to make a selection.

User interface 800 may further include field 804 indicating a number of sources to use in identifying a customer behavioral characteristic. Any number of sources may be identified in field 804 and again, as desired, a selection may be made from a drop-down menu, by inserting the desired number of sources in field 804, or any other known method of selection. In some arrangements, the number of sources identified may include internal sources (e.g., sources associated with the financial institution and/or supported by the financial institution) as well as external sources (e.g., sources not associated with the financial institution or supported by the financial institution).

Fields 806a-806c include identification of the desired sources for collecting data to identify one or more customer behavioral characteristics. As discussed above, the data sources may reflect various channels of performing transactions with the financial institution, such as ATMs, on-line banking, and the like. Selection of the sources may be performed using drop-down menus or any other known methods of selection. Although three source fields 806a-806c are shown in FIG. 8, more or fewer source fields may be provided as desired.

Once the desired sources have been selected and/or identified, "ok" option 808 may be selected. Selection of option 808 may process the selections made in fields 802-806c. Alternatively, selection of "clear" option 810 may clear all selections made in fields 802-806c. In some examples, selection of "clear" option 810 may return fields 802-806c to a default setting.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments.

What is claimed is:

1. An apparatus comprising:
   at least one processor; and
   at least one memory having stored therein computer executable instructions, that when executed by the at least one processor, cause the apparatus to perform a method of:
   receiving a first user input, the first user input indicating a first access of a first account of a user at a first account accessing device, the first account associated with a financial entity;
   determining a type of channel between the user and the first account accessing device;
   determining at least one temporal parameter associated with the first access of the first account of the user at the first account accessing device;
   determining user used financial entity services associated with at least one account of the user;
   determining current allowable actions on the first account by the user;
   receiving a second user input, the second user input indicating a first action, of the current allowable actions, of the user at the first account accessing device;
   identifying at least one behavioral characteristic of the user based upon the determined type of channel, the determined at least one temporal parameter, the determined user used financial entity services, the determined current allowable actions, and the received second user input;
   determining a content for output to the user upon another occurrence of the user accessing the first account accessing device, the determining the content being based upon the at least one behavioral characteristic of the user, the content being at least one offer for at least one user unused financial entity service;
   receiving a third user input, the third user input indicating a use of the first account accessing device by the user; and
   transmitting the content to the first account accessing device in response to receiving the third user input.

2. The apparatus of claim 1, the computer executable instructions further causing the apparatus to perform a method of determining a second account of the user, the second account associated with the financial entity and being one of the at least one account of the user.

3. The apparatus of claim 1, the computer executable instructions further causing the apparatus to perform a method of determining at least one of: a location of the user and a location of the first account accessing device, wherein the identifying further is based upon the determined at least one of: the location of the user and the location of the first account accessing device.

4. The apparatus of claim 1, the computer executable instructions further causing the apparatus to perform a method of receiving a fourth user input, the fourth user input indicating an access by the user to the content.

5. The apparatus of claim 4, the computer executable instructions further causing the apparatus to perform a method of receiving a fifth user input, the fifth user input including a user request to include the at least one offer for the at least one user unused financial entity service as one of the user used financial entity services associated with at least one account of the user.

6. The apparatus of claim 1, wherein the first action is a request to deposit a monetary check into the first account accessing device.

7. The apparatus of claim 6, wherein the at least one offer for the at least one user unused financial entity service is an offer for direct deposit of monetary funds from an issuing entity of the monetary check.

8. The apparatus of claim 1, wherein the type of channel between the user and the first account accessing device is one of: a web browser channel, a mobile cellular communication channel, an automated teller machine, and a short message service communication channel.

9. The apparatus of claim 1, wherein the determining at least one temporal parameter associated with the first access of the first account of the user at the first account accessing device includes determining whether the user has accessed the first account accessing device before.

10. The apparatus of claim 1, the computer executable instructions further causing the apparatus to perform a method of:
    determining at least one user customized interface parameter associated with the first account accessing device, wherein the identifying the at least one behavioral characteristic of the user further is based upon the determined at least one user customized interface parameter.

11. The apparatus of claim 1, the computer executable instructions further causing the apparatus to perform a method of determining a role of the user with respect to the first account, wherein the identifying further is based upon the determined role of the user with respect to the first account.

12. The apparatus of claim 11, wherein the role of the user is one of: owner, trustee, and guarantor.

13. One or more non-transitory computer-readable media storing computer-readable instructions that, when executed by at least one computer, cause the at least one computer to perform a method of:
    receiving a first user input, the first user input indicating a first access of a first account of a user at a first account accessing device, the first account associated with a financial entity;
    determining a type of channel between the user and the first account accessing device;
    determining at least one temporal parameter associated with the first access of the first account of the user at the first account accessing device;
    determining user used financial entity services associated with at least one account of the user;

determining current allowable actions on the first account by the user;

receiving a second user input, the second user input indicating a first action, of the current allowable actions, of the user at the first account accessing device;

identifying at least one behavioral characteristic of the user based upon the determined type of channel, the determined at least one temporal parameter, the determined user used financial entity services, the determined current allowable actions, and the received second user input;

determining a content for output to the user upon another occurrence of the user accessing the first account accessing device, the determining the content being based upon the at least one behavioral characteristic of the user, the content being at least one offer for at least one user unused financial entity service;

receiving a third user input, the third user input indicating a use of the first account accessing device by the user; and transmitting the content to the first account accessing device in response to receiving the third user input.

14. The one or more non-transitory computer-readable media of claim 13, the computer-readable instructions further causing the at least one computer to perform a method of determining a second account of the user, the second account associated with the financial entity and being one of the at least one account of the user.

15. The one or more non-transitory computer-readable media of claim 13, the computer-readable instructions further causing the at least one computer to perform a method of:
receiving a fourth user input, the fourth user input indicating an access by the user to the content; and
receiving a fifth user input, the fifth user input including a user request to include the at least one offer for the at least one user unused financial entity service as one of the user used financial entity services associated with at least one account of the user.

16. The one or more non-transitory computer-readable media of claim 13, wherein the first action is a request to deposit a monetary check into the first account accessing device, wherein the at least one offer for the at least one user unused financial entity service is an offer for direct deposit of monetary funds from an issuing entity of the monetary check.

17. A method comprising:
receiving a first user input, the first user input indicating a first access of a first account of a user at a first account accessing device, the first account associated with a financial entity;

determining a type of channel between the user and the first account accessing device;

determining at least one temporal parameter associated with the first access of the first account of the user at the first account accessing device;

determining user used financial entity services associated with at least one account of the user;

determining current allowable actions on the first account by the user;

receiving a second user input, the second user input indicating a first action, of the current allowable actions, of the user at the first account accessing device;

identifying at least one behavioral characteristic of the user based upon the determined type of channel, the determined at least one temporal parameter, the determined user used financial entity services, the determined current allowable actions, and the received second user input;

determining a content for output to the user upon another occurrence of the user accessing the first account accessing device, the determining the content being based upon the at least one behavioral characteristic of the user, the content being at least one offer for at least one user unused financial entity service;

receiving a third user input, the third user input indicating a use of the first account accessing device by the user; and transmitting the content to the first account accessing device in response to receiving the third user input;

wherein the at least one behavioral characteristic is associated with accessing the first account.

18. The method of claim 17, further comprising determining a second account of the user, the second account associated with the financial entity and being one of the at least one account of the user.

19. The method of claim 17, further comprising:
receiving a fourth user input, the fourth user input indicating an access by the user to the content; and
receiving a fifth user input, the fifth user input including a user request to include the at least one offer for the at least one user unused financial entity service as one of the user used financial entity services associated with at least one account of the user.

20. The method of claim 17, wherein the first action is a request to deposit a monetary check into the first account accessing device, wherein the at least one offer for the at least one user unused financial entity service is an offer for direct deposit of monetary funds from an issuing entity of the monetary check.

* * * * *